United States Patent [19]

Urbanic et al.

[11] Patent Number: 4,717,052
[45] Date of Patent: Jan. 5, 1988

[54] MOLTEN METAL CONDUIT

[75] Inventors: John M. Urbanic, Churchill Borough; Jan H. Van Linden, Allison Park, both of Pa.

[73] Assignee: Aluminum Company of America, Pittsburgh, Pa.

[21] Appl. No.: 884,434

[22] Filed: Jul. 11, 1986

[51] Int. Cl.[4] .................. B22D 39/00; F16L 11/02
[52] U.S. Cl. ............................... 222/590; 222/591; 222/600; 164/337; 266/236; 138/123
[58] Field of Search .................... 222/590–594, 222/597, 600, 606, 607, 529; 266/236, 280, 287; 164/337, 437, 440; 138/123, 124, 149, 137, D 2

[56] References Cited

U.S. PATENT DOCUMENTS

| | | | |
|---|---|---|---|
| 3,618,925 | 11/1971 | Girolami | 164/337 X |
| 3,659,644 | 5/1972 | De Bie | 164/56 X |
| 4,208,373 | 6/1980 | Matovich | 138/123 X |
| 4,270,595 | 6/1981 | Coward | 164/415 |
| 4,401,243 | 8/1983 | Diederich et al. | 222/591 |
| 4,450,872 | 5/1984 | Orcutt | 138/149 |
| 4,582,094 | 4/1986 | Stausebach | 138/149 X |
| 4,589,466 | 5/1986 | Chandley et al. | 222/600 X |
| 4,623,130 | 11/1986 | Brückner et al. | 222/600 X |

FOREIGN PATENT DOCUMENTS

| | | | |
|---|---|---|---|
| 8406102 | 8/1984 | South Africa . | |
| 2057103 | 3/1981 | United Kingdom | 222/593 |

Primary Examiner—Joseph J. Rolla
Assistant Examiner—Nils E. Pedersen
Attorney, Agent, or Firm—Max L. Williamson

[57] ABSTRACT

A value for controlling the flow of molten metal which includes a tubular conduit through which the metal flows and apparatus for applying a force against the exterior of the conduit to vary the size of the cross-sectional area of the opening through the conduit and thereby control the volume of metal flowing through the conduit.

32 Claims, 3 Drawing Figures

MOLTEN METAL CONDUIT

BACKGROUND

This invention relates to handling molten metal. By molten metal, we mean a metal in a liquid form having a relatively high melting temperature such as 500° F. or higher. Examples of such metals are aluminum and steel. More particularly, it relates to a flexible conduit for containing molten metal and a valve having a flexible conduit therein for controlling the flow of molten metal.

In the fabrication of metal, such as making mill products, for example, metal must be transported in molten form and sometimes the most convenient manner of transport is by flowing the metal via a trough or conduit. For example, in at least one method of making ingots for producing aluminum sheet or extrusions, molten aluminum is discharged through an opening in a melting furnace into a trough and thence to the molds. The mold is a relatively short hollow metal form having a cross section in the desired ingot shape extending downwardly from a level below the trough. The bottom of the form is closed with a member which is adapted for movement downwardly into a pit, and water spray nozzles are arrayed around the form. To make an ingot, molten metal is channeled into the top of the mold form as water is continuously sprayed on it. The metal solidifies as it cools and the movable member is moved steadily downwardly until the ingot is formed to the desired length. Typically, a number of ingots are made concurrently with the molten metal channeled from the trough to a plurality of molds. Since the ingots are continuously being lowered as they are formed, it is necessary that the flow of molten metal into the molds be maintained at a substantially uniform rate consistent with the rate of lowering. Furthermore, there is an optimum head of molten metal above the solidified ingot to be maintained in the mold to produce ingots free of defects. The head of molten metal affects the rate of solidification which, in turn, can affect the soundness of the ingot product. For a number of reasons, the rate of flow of metal entering the molds will vary if not controlled. For example, since the flow of metal from the furnace is by gravity through an opening near the bottom, the head of metal in the furnace affects the rate of discharge. As the furnace is drained, the head in the furnace lowers with a concurrent pressure drop on the metal flowing from the furnace.

Heretofore, the rate of flow of molten metal in molding metal has been controlled at the outlet from the furnace with the apparatus used to open and close the opening. Typically, the opening through the furnace wall is circular and is called a tap hole. The outlet end of the tap hole is frustoconical in cross section and a ceramic liner or seat fits within it. A tapered steel plug is driven into our out-of-tight contact with the ceramic seat to open or close the tap hole. In order to enable opening and closing the tap hole, the plug has a steel rod extending outwardly at an upward angle from its rear end. The rod rests on a bar placed across the trough leading from the tap hole. A lug extends upwardly from the rod, and to open or close the tap hole, an attendant simply hammers on the lug in one direction or another. Since the volume of metal issuing through the tap hole is a function of the clearance between the plug and the seat, the volume or rate of flow is also controlled by the attendant hammering on the lug. Although simple in operation, there are a number of problems associated with this system of flow control. For one thing, it is not a very precise way to control flow. Small changes in the plug position have a substantial effect on the metal flow. Further, the ceramic seats have to be replaced frequently because of erosion from the molten metal and damage during opening and closing, for example. In addition, dross and other foreign particles can become caught and stuck in the passage between the plug and seat and prevent adjusting downward or shutting off the flow without damaging the seat. From time to time, plugs freeze in the seats making their removal difficult.

For at least the foregoing reasons, it would be desirable to provide a valve for controlling the flow of molten metal.

SUMMARY OF THE INVENTION

The present invention is a tubular conduit made from a material which is compatible for contacting a molten metal, and it also includes apparatus for applying an external force on the conduit which varies the cross-sectional area of the opening through the conduit. Thus, the flow of metal through the conduit can be increased, decreased or stopped.

It is an objective of this invention to provide a simple, reliable valve to control the flow of molten metal.

This and other objectives and advantages of this invention will be more apparent with reference to the following description of a preferred embodiment and the appended drawings.

DESCRIPTION OF A PREFERRED EMBODIMENT

Figure 1:
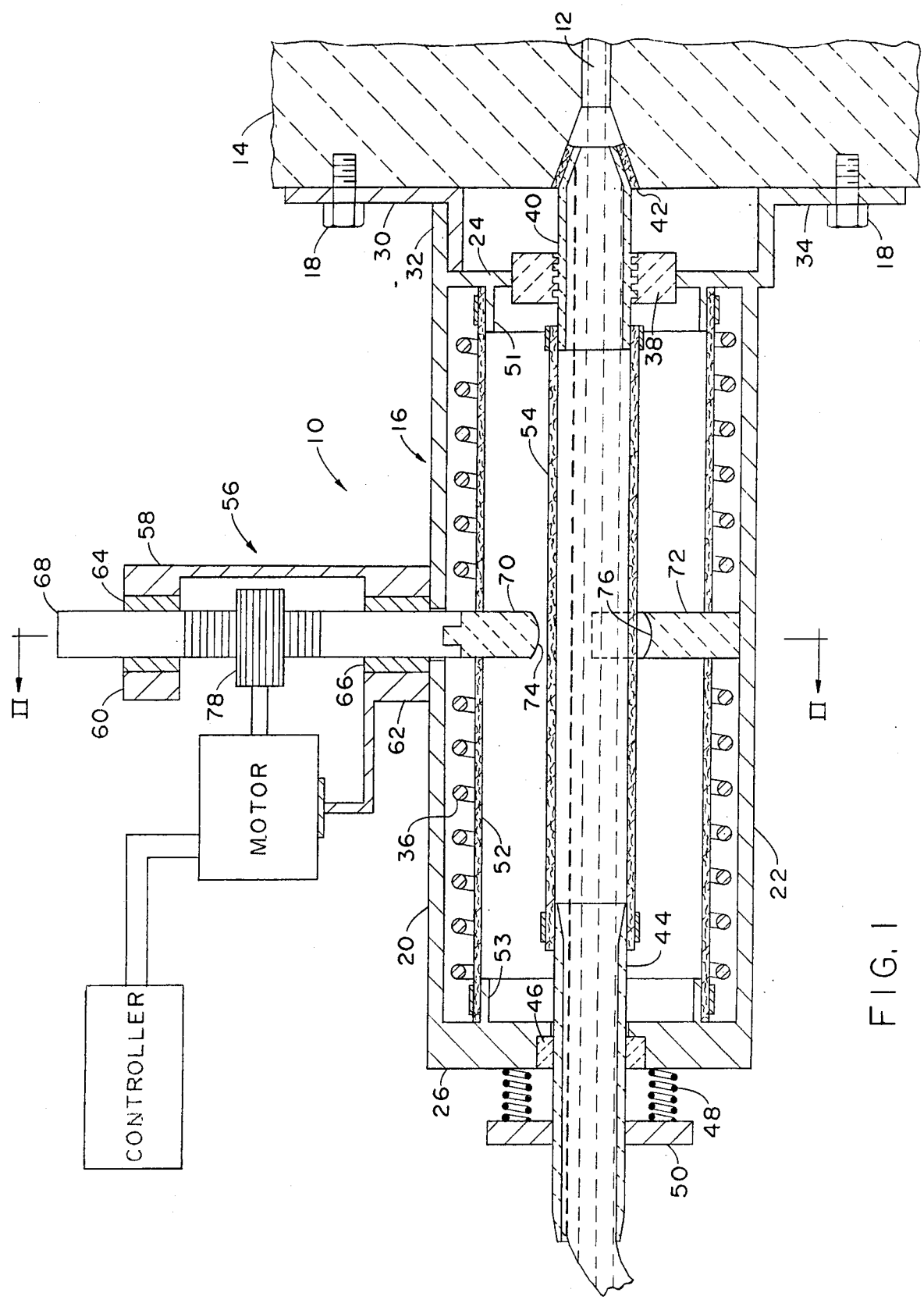
FIG. 1 is a cross-sectional elevation drawing of a valve of this invention attached to the sidewall of a furnace having molten metal therein.
Figure 2:
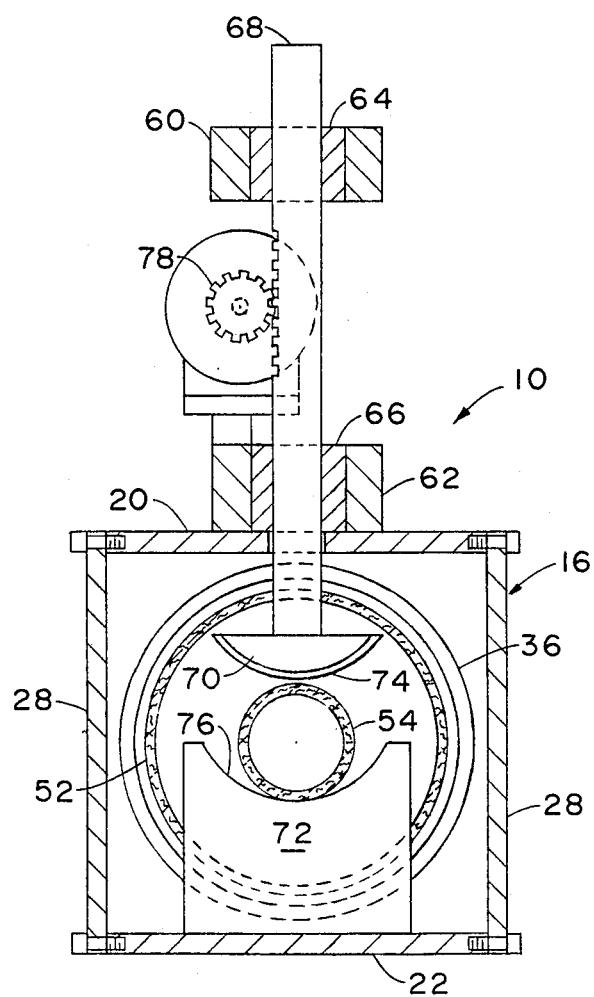
FIG. 2 is a transverse cross-sectional drawing of the valve shown in FIG. 1 at section line II—II.

For ease and convenience of description, a valve of this invention will be described with respect to its use to control the flow of molten aluminum from a melting furnace. It is to be understood that the valve is not limited to use in controlling the flow of molten aluminum nor in conjunction with its attachment to a melting furnace.

Referring now to the figures, a valve 10 of this invention is attached at the tap hole 12 through the sidewall 14 of a melting furnace. The valve portions which carry molten metal are within a housing 16 attached to the furnace sidewall 14 with bolts 18. The housing 16 is a box-like structure made of cut steel pieces welded into an assembly having a top wall 20, bottom wall 22, inner end wall 24, outer end wall 26, and optional sidewalls 28. If the sidewalls are provided, one or both may be removable to provide access to the interior of the housing 16 after it is attached to the furnace. To attach the housing 16 to the sidewall 14, a clip angle 30 is first attached to the sidewall 14 at a predetermined distance above the tap hole 12. A top wall lip 32 projecting outwardly from the inner end wall 24 of the housing 16 is rested on the outwardly projecting flange of the clip angle 30, and an angle 34 welded to the junction of the bottom wall 22 and inner wall 24 is bolted to the furnace sidewall 14. If additional support is necessary, clip angles from the furnace to the sides of the housing can also be provided. Inside the housing 16, an electrical heating coil 36 is provided to furnish heat sufficient to keep aluminum flowing from the furnace, as will be discussed later. Suitable types of heating devices and means of attachment to structures like a housing 16 are well known to those skilled in the art of handling metals. The inner end wall 24 is provided with a ceramic collar 38 through a central opening. The interior bore of the collar 38 is threaded to accommodate a ceramic nozzle 40 made of a ceramic compatible with molten aluminum, such as a nonwetting fused silica ceramic, for example. The furnace end of the nozzle 40 is tapered and frustoconical in cross section to fit within the frustoconical-shaped recess in the furnace wall around the tap hole 12. A gasket 42 of a material suitable for use in contacting molten aluminum, such as a gasket made from alumina and silica fibers and sold by 3M under the trademark Fiber-Frax, for example, is interposed between the nozzle 40 and the recess in the furnace. Prior to attaching the housing 16 to the furnace, the nozzle 40 is threadably engaged with the collar 38 so that the frustoconical end of the nozzle projects away from the housing inner wall 24 a distance which provides a tight fit against the gasket 42. A nozzle 44 is also provided through a central opening in the housing outer end wall 26. A heat-resistant bushing 46 made from a material, such as a nonwetting fused silica ceramic, for example, is provided in the opening in order that the nozzle is free to move longitudinally, as will be discussed later. A tension spring 48 is around the nozzle 44 between the end wall 26 and a collar 50 projecting radially outward from the nozzle for reasons which will also be discussed later. Annular flanges 51, 53 project inwardly from the housing end walls 24, 26 to fit within a woven fabric sleeve 52 made of a ceramic fiber material. This sleeve 52 is not essential to the invention but is provided as a safety feature to catch any molten metal which might otherwise escape if a failure in the valve were to occur. A woven fabric conduit 54 is connected to the ends of the inner and outer nozzles 40, 44. The sleeve 52 and the conduit 54 can be connected to the flanges 50 and nozzles 40, 44 with clamps around their periphery, for example. The conduit 54 and the sleeve 52 may be made from the same woven fabric material. A woven fabric material suitable for contacting and containing aluminum is made with ceramic fibers. Ceramic fibers are made from nonmetallic inorganic materials which can be woven into textiles and fabrics and are characterized by relative retention of strength and flexibility properties at elevated temperatures, e.g., temperatures in excess of 1000° F. For a ceramic fiber fabric to be satisfactory for use in containing a molten metal, it must be nonwetting and woven in a tight enough weave to prevent the passage of metal through it at a given pressure. A fiber which has nonwetting characteristics with respect to molten aluminum is a continuous polycrystalline metal oxide fiber comprised of approximately 62% by weight $Al_2O_3$, 14% by weight $B_2O_3$ and 24% by weight $SiO_2$ and sold by Minnesota Mining & Manufacturing Co. under the trademark Nextel 312. In this preferred embodiment, the molten aluminum is under a pressure of a little more than three pounds per square inch at the valve. It was determined that a woven fabric of 900 denier yarn made from Nextel 312 fibers 0.027 inch thick and having a weight of 19.3 oz/yd$^2$ contains molten aluminum at such a pressure. A fabric having a tighter weave might be necessary to contain molten aluminum at a higher pressure. As an alternative solution or improvement in providing a suitable fabric for use at higher pressures, the nonwetting characteristic of the fiber can be improved. There are several ways in which the nonwetting characteristics of a Nextel 312 fabric can be improved, such as spray coating, immersion of the fabric or individual strands prior to weaving, or vacuum impregnation of the fibers with a nonwetting material such as boron nitride, for example. To demonstrate the degree of improvement by impregnating with boron nitride, tests were made comparing the molten metal pressure resistance of an untreated fabric with that of two identical fabrics which were treated with boron nitride. One of the treated fabrics was supplied by 3M Co. and the other was prepared at Alcoa Technical Center. Each sample was tested by exposing a circular area having a three-inch diameter to a molten aluminum alloy under increasing pressure until a pressure was reached which forced the molten metal through the fabric. The tests indicated that the fabric treated with boron nitride withstood pressures of molten metal approximately 100% greater than the untreated fabric.

The operable portion of the valve 10 to control the flow of metal is supported by a bracket 56 extending upwardly from the housing top wall 20. The bracket 56 is comprised of a vertical support 58 and an upper and lower bearing housing 60, 62. Upper and lower bearings 64, 66 in the housings accommodate and support a valve shaft 68 extending through the bearings into the housing 16. A valve gate 70 is affixed to the end of the shaft 68 and a gate seat 72 extends upwardly from the housing bottom wall 22 in alignment with the gate. The opposing surfaces 74, 76 of the gate 70 and the seat 72 have matching arcuate surfaces such that the gate surface will fit tightly against the seat surface.

The shaft 68 is geared to be powered up and down by a motor driven pinion 78. Thus, by actuating the motor, the gate 70 can be brought into contact against the flexible conduit 54 pressing it downward against the seat 72. It may be seen that the opening through the conduit 54 can be very precisely reduced or enlarged to vary the flow of metal therethrough. If desired, the flow of metal can be completely stopped by pinching the conduit 54 shut between the arcuate surfaces 74, 76 of the gate 70 and seat 72. Operation of the valve can be controlled by an attendant or adapted for automatic control. A float switch can be attached to an ingot mold in a manner that causes a signal to be sent to a controller to turn the motor on in forward or reverse or stop it depending upon the level of molten metal in the ingot mold. Thus, the desired head of molten metal in the mold can be continuously monitored and controlled.

It is to be noted that, if desired, a conventional plug can be inserted through the nozzles 40, 44, the connecting conduit 54, and seated in the tap hole 12. Thereafter, the valve can be removed or repaired as necessary. As has been noted before, the outer nozzle 44 is spring mounted on the exit end. Thus, when the conduit 54 fills with metal and tends to sag due to its flexible nature, strain on the connection between the conduit 54 and nozzles 40, 44 is minimized because the outer nozzle 44 is free to move axially against the spring.

Figure 3:
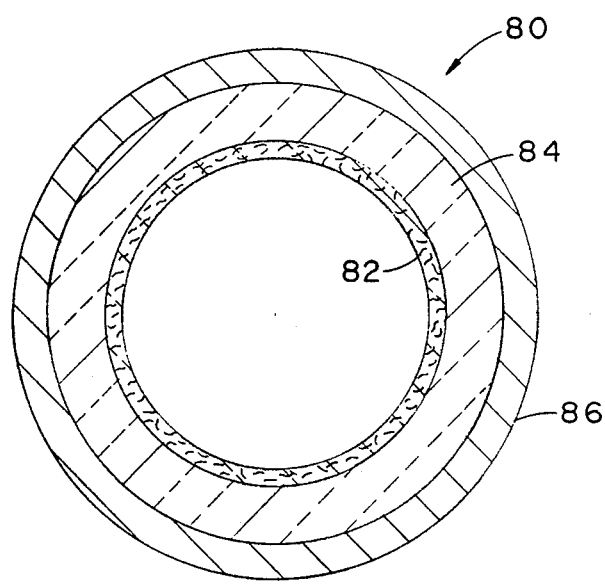
FIG. 3 is a cross-sectional drawing of a flexible tubular conduit of this invention.

It is also to be noted that a fabric conduit 54 as used in this invention is not limited thereto. It may also be used as a transport or carrier in moving molten metal from one location to another. Properly insulated and supported, a fabric conduit of this invention can be used as a hose and eliminate flowing metal in open troughs or transporting it in ladles. At least one way in which it can be used as a hose may be seen with reference to FIG. 3. The hose 80 is comprised of an inner layer 82 of woven ceramic fiber, such as Nextel 312, capable of holding molten metal at the anticipated pressure. Around the inner layer is an intermediate wrapper of insulation 84 to minimize the heat loss as the metal moves through the conduit. Around the insulation layer is a flexible outer wrap 86 which is provided to protect the insulated conduit from damage from external blows or loads. This outer wrap may be a reinforced fabric as is used in making a fire hose, for example, or a woven or braided metal or otherwise flexible metal hose.

While the invention has been described in terms of preferred embodiments, the claims appended hereto are intended to encompass all embodiments which fall within the spirit of the invention.

What is claimed is:

1. A valve for controlling the flow of molten metal, comprising:
   a flexible tube of a material compatible for contact with a molten metal to be flowed therethrough; and
   means for selectively applying and releasing an external force against the tube which reduces or enlarges the cross-sectional area of the opening through the tube and thereby enables varying the volume of metal which can flow therethrough.

2. A valve as claimed in claim 1 wherein at least a portion of the tube is made from a ceramic fiber.

3. A valve as claimed in claim 2 wherein at least a portion of the tube is made from polycrystalline metal oxide fibers.

4. A valve as claimed in claim 3 wherein the metal oxides comprise alumina, boria and silica.

5. A valve as claimed in claim 1 wherein the means for applying an external force is a gate member and a seat member in alignment with the tube in between and with at least one of the members capable of being moved toward the other.

6. A valve as claimed in claim 5 wherein the member capable of being moved is connected to a power source for applying power to move the member.

7. A valve as claimed in claim 6 wherein the power source is controlled automatically by means for measuring and monitoring the flow of molten metal.

8. A valve as claimed in claim 1 which further includes means for heating to maintain the temperature of a metal being flowed therethrough above its melting point.

9. A valve as claimed in claim 1 wherein the tube has an inlet end and an outlet end and the valve further includes means of attaching the valve to a wall of a vessel for containing molten metal in a manner that the inlet end of the tube is in contact with an opening in the wall so that molten metal can pass from the vessel into the tube.

10. A valve as claimed in claim 9 wherein the means for attaching the valve is a housing having an inner end adapted for attachment to the vessel wall with the tube inlet end extending therethrough and an outer end with the tube outlet end extending therethrough.

11. A valve as claimed in claim 10 wherein the inlet end of the tube has an exterior surface portion adapted to contact a sealing surface within the vessel wall opening and the valve includes means for forcing such portion of the tube into a tight sealing contact with the sealing surface.

12. A valve as claimed in claim 11 wherein the means for forcing a portion of the inlet end of the tube into tight sealing contact with the vessel wall opening sealing surface is a threaded connection between an end wall on the housing inner end and a portion of the inlet end of the tube so that the inlet end may be screwed into tight sealing contact with the vessel opening.

13. A valve as claimed in claim 10 wherein the tube has rigid inlet and outlet end portions extending through the inner and outer ends of the housing with a flexible portion extending therebetween and with the outlet end portion of the tube connected with an end wall on the housing outer end with means which permits axial movement of the rigid outlet end portion.

14. A valve as claimed in claim 13 wherein the flexible portion of the tube is made from a ceramic fiber.

15. A valve as claimed in claim 14 wherein the ceramic fiber is treated with means for improving its nonwetting characteristics against molten metal.

16. A valve as claimed in claim 15 wherein the means for improving the nonwetting characteristics is treating the fiber with boron nitride.

17. A valve as claimed in claim 14 wherein the ceramic fiber is a polycrystalline metal oxide fiber.

18. A valve as claimed in claim 17 wherein the metal oxides comprise alumina, boria and silica.

19. A valve as claimed in claim 13 wherein the means for applying an external force to the tube is a seat member attached to the housing below the flexible portion and a gate member in alignment therewith above the flexible portion adapted for movement towards and away from the seat member.

20. A valve as claimed in claim 10 wherein the housing has an inner end wall and outer end wall and includes a tubular member extending therebetween which encloses the tube.

21. A valve as claimed in claim 20 wherein the tubular member is made from a ceramic fiber.

22. A method for transporting molten metal comprising providing an elongated flexible tube having relatively thin sidewalls made from a fabric woven with ceramic fibers and containing molten metal as it is flowed therethrough.

23. A method as claimed in claim 22 wherein the step of providing the flexible tube includes providing a tube made from a fabric treated with means for improving the nonwetting characteristics of the fabric with respect to molten metal.

24. A method as claimed in claim 23 wherein the means for improving the nonwetting characteristics is treating the fabric with boron nitride.

25. A method as claimed in claim 22 wherein the step of providing a flexible tube includes ceramic fibers which are polycrystalline metal oxide fibers.

26. A method as claimed in claim 22 wherein the step of providing a flexible tube includes ceramic fibers comprising alumina, boria and silica.

27. A method as claimed in claim 22 which includes transporting molten aluminum and flowing molten aluminum through the flexible tube.

28. A tubular conduit for containing a flowing molten metal comprising a flexible tube made from a fabric woven with ceramic fibers having an insulating means therearound and around the insulation means a protective means to protect the tube and insulation means from external damage.

29. A conduit as claimed in claim 28 wherein the fabric in the tube is treated with means for improving its nonwetting characteristics with respect to molten metal.

30. A conduit as claimed in claim 29 wherein the means for improving the nonwetting characteristics is boron nitride.

31. A conduit as claimed in claim 28 wherein the ceramic fibers are polycrystalline metal oxide fibers.

32. A conduit as claimed in claim 28 wherein the ceramic fibers comprise alumina, boria and silica.

* * * * *